(12) United States Patent
Sugano et al.

(10) Patent No.: US 8,430,608 B2
(45) Date of Patent: Apr. 30, 2013

(54) DRILL

(75) Inventors: Hiroto Sugano, Toyokawa (JP); Seiji Ohhashi, Toyokawa (JP)

(73) Assignee: OSG Corporation, Aichi (JP)

( * ) Notice: Subject to any disclaimer, the term of this patent is extended or adjusted under 35 U.S.C. 154(b) by 982 days.

(21) Appl. No.: 12/224,916

(22) PCT Filed: Nov. 30, 2006

(86) PCT No.: PCT/JP2006/324031
§ 371 (c)(1), (2), (4) Date: Sep. 8, 2008

(87) PCT Pub. No.: WO2008/068817
PCT Pub. Date: Jun. 12, 2008

(65) Prior Publication Data
US 2009/0060670 A1    Mar. 5, 2009

(51) Int. Cl.
*B23B 47/34* (2006.01)

(52) U.S. Cl.
USPC .............................................. 408/67; 408/230

(58) Field of Classification Search .................... 408/56, 408/230, 67; B23B 47/34
See application file for complete search history.

(56) References Cited

U.S. PATENT DOCUMENTS

| | | | | |
|---|---|---|---|---|
| 716,557 | A * | 12/1902 | Klingensmith | 408/214 |
| 1,352,825 | A * | 9/1920 | Meredith et al. | 408/207 |
| 3,032,129 | A * | 5/1962 | Fletcher et al. | 175/320 |
| 3,555,937 | A * | 1/1971 | Nicodemas | 408/59 |
| 4,313,506 | A * | 2/1982 | O'Connell | 175/420.1 |
| 4,492,278 | A * | 1/1985 | Leighton | 175/420.1 |
| 4,515,230 | A * | 5/1985 | Means et al. | 175/420.1 |
| 5,287,937 | A * | 2/1994 | Sollami et al. | 175/427 |
| 5,842,924 | A * | 12/1998 | Manos et al. | 470/198 |
| 6,086,292 | A * | 7/2000 | Yokoyama | 408/67 |
| 6,189,633 | B1 * | 2/2001 | Kleine et al. | 175/418 |
| 6,595,305 | B1 * | 7/2003 | Dunn et al. | 175/420.1 |
| 6,948,890 | B2 * | 9/2005 | Svensson et al. | 408/59 |
| 6,968,912 | B2 * | 11/2005 | Sollami et al. | 175/420.1 |
| 7,100,714 | B1 * | 9/2006 | Sollami | 175/427 |
| 8,002,054 | B2 * | 8/2011 | Swope et al. | 175/427 |

FOREIGN PATENT DOCUMENTS

| | | | |
|---|---|---|---|
| EP | 2140960 A2 * | 1/2010 | |
| JP | 40-19634 | 9/1965 | |
| JP | 57-89511 | 6/1982 | |
| JP | 58-137514 | 8/1983 | |
| JP | 2-35654 | 3/1990 | |
| JP | 06055401 A * | 3/1994 | |
| JP | 8-141813 | 6/1996 | |
| JP | 2008178941 A * | 8/2008 | |

\* cited by examiner

*Primary Examiner* — Eric A Gates
(74) *Attorney, Agent, or Firm* — Muramatsu & Associates

(57) ABSTRACT

A drill is capable of forcibly aspirating and discharging chips to prevent environmental contamination as well as to simplify cleaning the chips. The drill has an intake hole and an opening formed therein so that the aspiration takes place through the intake hole and the chips generated in the cutting process can forcibly be aspirated from the opening. Because the chips can be discharged without using cutting fluid, the drill is useful for preventing environmental contamination. Moreover, as the chips are forcibly aspirated from the opening and discharged through the intake hole, the chips are not scattered around a workpiece under the cutting process and cleaning the chips can become simple and easy.

8 Claims, 4 Drawing Sheets

| Diameter of intake hole (mm) | Chip aspiration rate(%) | Chip discharge capability |
|---|---|---|
| 2 | 100 | Good |
| 2.5 (Present Invention) | 100 | Good |
| 3 | 100 | Good |
| 3.5 | - | - (Broken and Damaged) |
| 4 | - | - (Broken and Damaged) |

FIG. 4(a)

| Open length of the opening(mm) | Chip aspiration rate(%) | Chip discharge capability |
|---|---|---|
| 2.04 | - | - (Broken and Damaged) |
| 3.4 | 100 | Good |
| 6.8 (Present Invention) | 100 | Good |
| 8.16 | 100 | Good |
| 13.6 | - | - (Broken and Damaged) |

FIG. 4(b)

DRILL

TECHNICAL FIELD

The present invention relates to drills; and, more particularly, to a drill capable of forcibly aspirating and discharging chips to prevent environmental contamination as well as to simplify cleaning the chips.

BACKGROUND ART

A typical cutting process utilizes cutting fluid to discharge chips generated in the process. Among drills in the past that discharge the chips with the aid of the cutting fluid, there is a drill having an oil hole formed in a body for circulating the cutting fluid and a hole in communication with the oil hole, wherein a top end of the communication hole is opened into a chip discharge groove.

According to this drill, the cutting fluid having passed through the oil hole is discharged into the chip discharge groove from the communication hole and is guided along the chip discharge groove until it is eventually discharged therefrom to the outside together with the chips.

Meanwhile, there is a drill capable of discharging the chips without the use of the cutting fluid. For example, Patent Document 1 (Japanese Patent Application Laid-Open Publication No. S57-89511) discloses a drill having a chip discharging hole formed inside the body and an outlet port formed in communication with the chip discharging hole, wherein a top end of the outlet port is opened into a periphery of the body.

According to this drill, as the body of the drill starts rotating, newly generated chips entering the chip discharging hole slowly pushes out the old ones that had already circulated along the chip discharging hole through the outlet port.

DISCLOSURE OF THE INVENTION

Problems to be Solved by the Invention

However, the cutting fluid in general contains toxic substances such as chlorine or phosphor, so frequent use of the cutting fluid is one of leading factors of the environmental contamination.

In addition, since the drill according to Patent Document 1 is able to discharge the chips only through a rotational force of the body, the chips scatter all around a workpiece to be done during the cutting process, thereby making it harder to clean them.

It is, therefore, an object of the present invention to provide a drill capable of forcibly aspirating and discharging the chips to prevent environmental contamination as well as to simplify cleaning the chips.

Means for Solving the Problems

For achieving the object, the first aspect of the present invention is a drill having a front end and a rear end, comprising a body at the rear end, a cutting point at the front end with a cutting edge which is integrally extended to the body, and a plurality of grooves (flutes) formed in the cutting point and the body for composing a rake face of the cutting edge, and cutting a workpiece with the cutting edge when rotating about a center. An intake hole is extendedly formed inside the body and the cutting point from a rear end of the body to the cutting point. The intake hole has a circular cross-section and has a diameter smaller than a diameter of the body and larger than a bottom diameter (core diameter) of the groove and has an opening which is open from the groove towards the outside, where the bottom diameter is a diameter of a cylinder tangent to the grooves at the deepest point of each of the grooves. A front end of the opening at the top end of the cutting point is positioned within a longitudinal range of the cutting edge, and an aspiration process is carried out through the intake hole with use of negative pressure, thereby aspirating chips generated during the cutting of the workpiece from the opening.

According to the second aspect of the present invention, in addition to the drill according to the first aspect of the invention, the diameter of the intake hole is 65% or less of the diameter of the body.

According to the third aspect of the present invention, in addition to the drill according to the first and second aspects noted above, a length of the opening towards a direction of the center axis is in a range from 50% to 150% of the diameter of the body.

According to the fourth aspect of the present invention, in addition to the drill according to one of the first to third aspects noted above, the groove is extendedly formed at least to the range of the cutting edge and has an extended such that a distance between a rear end of the opening and a rear end of the groove is shorter than the diameter of the body.

EFFECTS OF THE INVENTION

Since the drill according to the first aspect of the present invention has an intake hole and an opening formed therein, aspiration takes place through the intake hole and the chips generated in the cutting process can forcibly be aspirated from the opening.

Because the chips can be discharged without the use of the cutting fluid, the present invention drill is useful for preventing environmental contamination, also, the processing expense can be cut down by not using the cutting fluid.

Moreover, as the chips are forcibly aspirated from the opening and discharged through the intake hole, the chips are not scattered around a workpiece to be done and cleaning the chips can become simple and easy.

Compared with a drill in the past which exerts no compulsive force and allows newly generated chips to slowly push out old chips, the present invention drill demonstrates an improved discharge performance by preventing the intake hole from getting clogged with the chips.

Furthermore, since the opening is formed on the groove and the chips are aspirated from the opening, the groove for accommodating the chips can be formed to have a smaller accommodating space, for example, the length of the groove can be shortened, the width of the groove can be narrowed or the depth of the groove can be reduced. In this manner, it is possible to ensure high rigidity for a tool and the tool life can be prolonged. Further, an end portion of the opening at the top end of a cutting point is located within a range of a cutting edge, to therefore increase the performance of the chip aspiration. If the end portion of the opening at the top end of the cutting point is located at the top end of the cutting point, that is, if the intake hole passes through the cutting point, sufficient negative pressure is not obtained at the opening, causing an insufficient aspiration force during an aspiration process. This leads to decrease of the chip aspiration. Meanwhile, if the end portion of the opening at the top end of the cutting point is not located within the range of the cutting edge, it means that the opening is not positioned correspondingly to the range of the cutting edge. This also leads to the decrease of the chip aspiration. On the contrary, if the end portion of the opening at the top end of the cutting point is located within the range of the cutting edge, a sufficient aspiration force can be maintained. Besides, because each chip cut by the cutting edge can be aspirated within the range of the cutting edge, the performance of the chip aspiration is improved.

Also, the structure for discharging the chips is simplified by extending the intake hole from a rear end side of the body.

In addition to the benefits brought by the drill described with respect to the first aspect of the present invention, the drill according to the second aspect ensures good rigidity by designing the diameter of the intake hole to be 65% or less of the diameter of the body.

If the diameter of the intake hole is larger than 65% of the diameter of the body, the wall thickness of the body becomes thinner and the rigidity of the tool is decreased. On the contrary, if the diameter of the intake hole is 65% or less of the diameter of the body, the tool may have high rigidity and increased life.

In addition to the benefits brought by the drill of the first and second aspects noted above, in the drill of the third aspect of the present invention, the size of the opening towards the direction of a center axis is 50% or more and 150% or less of the diameter of the body, so the performance of the chip aspiration can be improved as well.

If the size of the opening towards the direction of the center axis is less than 50% of the diameter of the body, an open area of the opening is not sufficiently big enough to aspirate the chips. Consequently, the performance of the chip aspiration is decreased.

On the other hand, if the size of the opening towards the direction of the center axis is more than 150% of the diameter of the body, an open area of the opening is too big to obtain the sufficient negative pressure, causing a decrease in the aspiration force during the aspiration process. This again decreases the performance of the chip aspiration.

Therefore, by setting the size of the opening towards the direction of the center axis to be 50% or more and 150% or less of the diameter of the body, an optimum open area of the opening can be obtained and a decrease in the aspiration force can be suppressed. Naturally, the performance of chip cutting is improved.

Since the chips are not generated in areas outside the moving range of the cutting edge, the size of the opening towards the direction of the center axis should be 150% or less of the diameter of the body. In this way, the rigidity of the tool is secured without adversely affecting the performance of the chip aspiration. As a result, the tool life is prolonged.

In addition to the benefits brought by the drill according to the first to third aspects noted above, the drill of the fourth aspect of the present invention is characterized in that the groove is extendedly formed at least up to a range of the cutting edge, so any chips generated by the cutting edge is accommodated within the full range of the cutting edge. Thus, the chips holding capacity is increased and the performance of the chip aspiration can be improved.

Moreover, since the extended length of the groove, which is expressed by a distance between a rear end of the opening and a rear end of the groove is shorter than the diameter of the body, the rigidity of the tool can be secured without decreasing the performance of the chip aspiration. This consequently leads to a prolonged tool life.

BRIEF DESCRIPTION OF THE DRAWINGS

FIG. 4 is a table showing results of a cutting test.

EXPLANATION OF REFERENCE NUMERALS AND SYMBOLS

1: Drill
2: Body
3: Cutting point
3a: Cutting edge
4: Groove (flute)
5: Intake hole
5a: Opening
Db: Diameter of body
Dg: Groove bottom diameter of groove (core diameter)
Dh: Diameter of intake hole
O: Center axis
Ps: End portion of opening, the end portion being on a top side of the cutting point.

BEST MODE FOR CARRYING OUT THE INVENTION

Figure 1A:
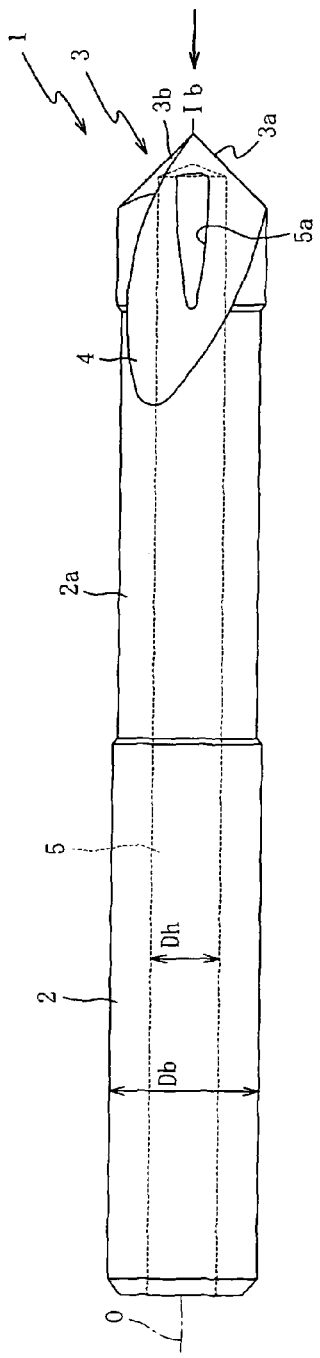
FIG. 1(a) is a front view of a drill according to one embodiment of the present invention.
Figure 1B:
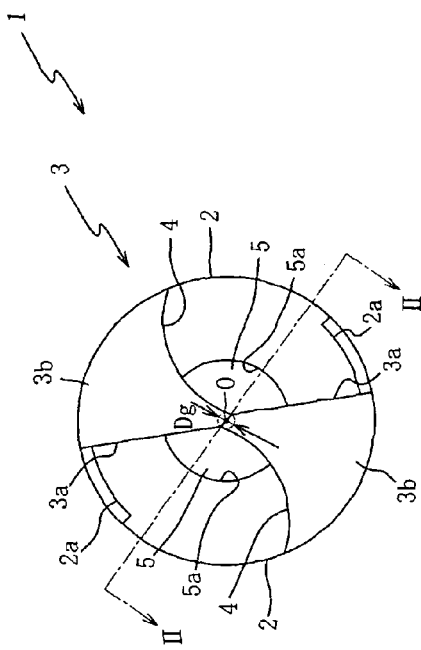
FIG. 1(b) is a side view of the drill seen from arrow Ib of FIG. 1(a).

The advantages, features and aspects of the invention will become apparent from the following description of the embodiments with reference to the accompanying drawings. First, one embodiment of a drill 1 of the present invention will be explained by referring to FIGS. 1(a) and 1(b) in which FIG. 1(a) is a front view of the drill 1, and FIG. 1(b) is a side view of the drill 1 seen from arrow Ib of FIG. 1(a).

The drill 1 is a tool for boring a hole in a workpiece to be processed (not shown) with use of torque translated from a processing machine (not shown). The drill has a front end (right end of FIG. 1(a)), and a rear end (left end of FIG. 1(a)) which is opposite to the front end. As shown in FIG. 1, the drill 1 is in a solid form obtained by press-sintering cemented carbide, e.g., tungsten carbide (WC), and it is composed of a body 2 at the rear end and a cutting point 3 at the front end extended from the body 2. However, the present invention is not limited to the drill 1 made of cemented carbide, but can be made of high-speed tool steel.

The body 2 is held in the processing machine through a holder 10 (refer to FIG. 3) and as shown in FIG. 1, it has a cylinder shape with a center axis O. Moreover, a relieving surface 2a is concavely formed along the outer circumferential surface of the body 2.

The relieving surface 2a is a part for reducing friction between the outer circumferential surface of the body 2 and the workpiece during the cutting process. As depicted in FIG. 1(a), it is extended to a predetermined length from a top end, i.e., a right end of the body 2 that is formed continuously integral with the cutting point 3. In this embodiment, a diameter Db of the body 2 shown in FIG. 1(a) without the relieving surface 2a is 6.8 mm.

The cutting point 3 is a part for performing the cutting process while rotating by a torque transferred from the processing machine through the body 2. As depicted in FIG. 1, it is mainly composed of a cutting edge 3a and a relief face 3b. In addition, two spiral-shaped grooves (flutes) 4 are concavely formed on outer surfaces of the cutting point 3 and the body 2, respectively.

The cutting edge 3a is a part for boring a hole in the workpiece by carrying out the cutting process. As depicted in FIG. 1(a), the cutting edge 3a is formed at the front end of the drill 1, i.e., at a top end (right end of FIG. 1(a)) of the cutting point 3. In this embodiment, the drill 1 is provided with two pieces of the cutting edge 3a arranged symmetrically with respect to the center axis O.

The relief face 3b is a part for reducing friction between the top end of the cutting point 3 and the workpiece during the cutting process. As depicted in FIG. 1(a), the top end (right end of FIG. 1(a)) of the cutting point 3 is formed obliquely at a predetermined relief angle. In this embodiment, two relief faces 9 are provided correspondingly to the two pieces of the cutting edges 3a, and arranged symmetrically with respect to the center axis O.

The groove 4 is a part for constituting a rake face of the cutting edge 3a and for accommodating the chips generated by the cutting edge 3a during the cutting process. As illustrated in FIG. 1, it is extended from the top end of the cutting point 3 to the relieving surface 2a. In detail, the extended length of the groove 4 towards the body 2 from 1(a)) of the cutting point 3 which is expressed by a distance between a rear (left) end of the opening 5a and a rear (left) end of the groove is 50% of the diameter Db of the body 2. In this embodiment, two grooves 4 are formed symmetrically with respect to the center axis O.

This groove (flute) 4 is formed by horizontally translating a rotating disk-shaped whetstone towards the rear end of the cutting point 3 from the top end of the cutting point 3 to the direction of the center axis O of the body 2. Accordingly, the groove 4 is formed approximately in parallel with the center axis O of the body 2 in form of groove bottom at the top end of the cutting point 3, and the shape of the groove bottom at the rear end of the cutting point 3 is cut out correspondingly to the shape of the whetstone, facing towards the rear end of the cutting point 3. As such, a bottom diameter of the groove 4 becomes larger toward the rear end (upper end of FIG. 2) of the cutting point 3. Here, the bottom diameter of the groove 4 is also called, in the industry, a core diameter which is a diameter of a cylinder tangent to the plurality of grooves (flutes) at the deepest point of each of the grooves. In this embodiment, the bottom diameter (core diameter) Dg of the groove 4 at the top end of the cutting point 3, which is formed, in the cross sectional view of FIG. 2, approximately in parallel with the center axis O of the body 2, is 0.7 mm.

Moreover, as illustrated in FIG. 1, inside the drill 1, an intake hole 5 is extendedly formed along the center axis O of the body 2 from the rear end (left end of FIG. 1(a)) of the body 2 to the approximate center within a range of the cutting edge 3a.

The intake hole 5, as described below, is a part for aspirating the chips during the cutting process. It has a circular cross section and its diameter Dh is smaller than the diameter Db of the body 2 while larger than the bottom diameter Dg of the groove 4. In this embodiment, the diameter Dh of the intake hole 5 is 2.5 mm.

As the intake hole 5 has the diameter Dh which is smaller than the diameter of Db of the body 2 yet larger than the bottom diameter (core diameter) Dg of the groove 4, an opening 5a which is open from the groove 4 to the outside can be formed in the intake hole 5, as depicted in FIGS. 1(a) and 1(b). As shown in FIG. 1(b), a diameter of the opening 5a is partly the same as that of the intake hole 5. However, since the opening 5a is formed on the groove but not formed on the relief face 3b of the cutting point 3, a cross sectional area of the opening 5a perpendicular to the center axis O is smaller than a cross sectional area of the intake hole 5 perpendicular to the center axis O.

Figure 2:
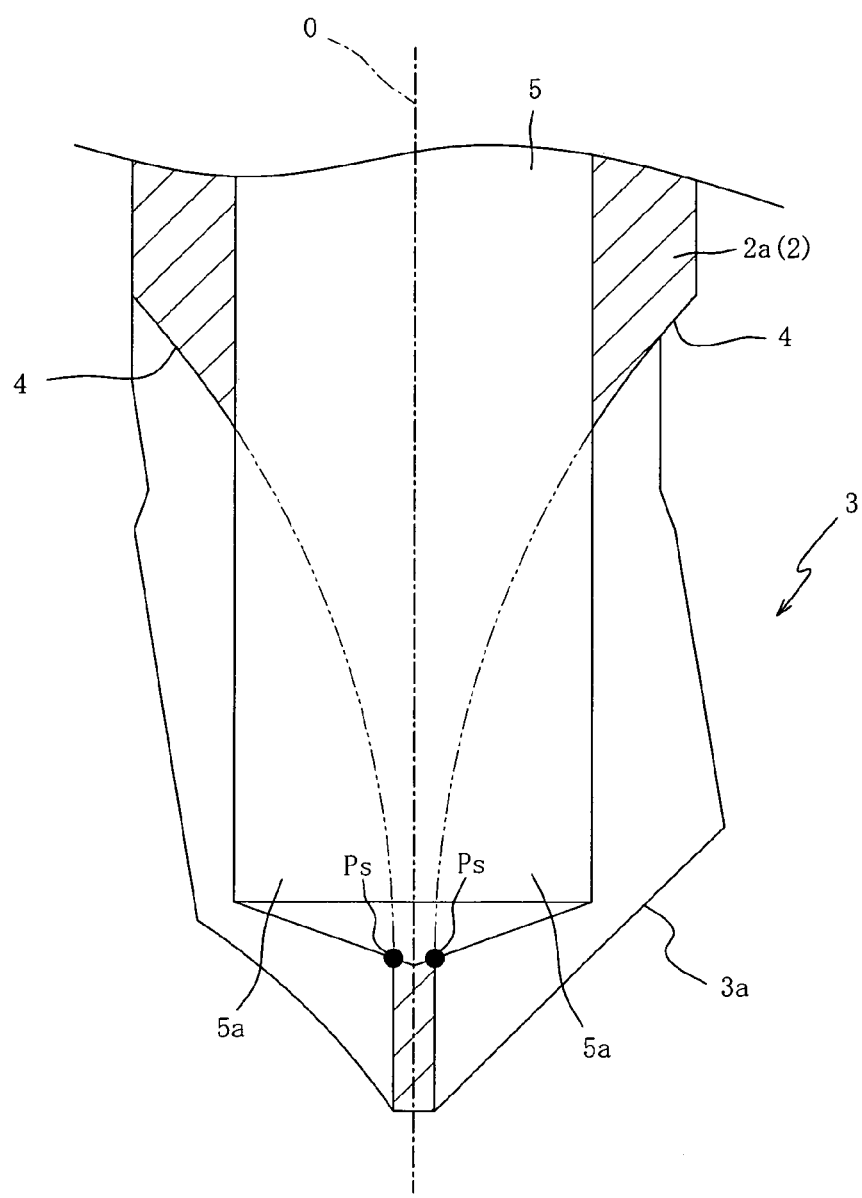
FIG. 2 is a cross-sectional view taken along line II-II of FIG. 1(b).

The following will now explain in detail about the configuration of the opening 5a, with reference to FIG. 2. FIG. 2 is a cross-sectional view of the drill 1 taken along line II-II of FIG. 1(b). In FIG. 2, the length of the body 2 in the direction of the center axis O is omitted.

The opening 5a is a part for aspirating the chips that are generated by the cutting edge 3a as the aspiration takes place through the intake hole 5 during the cutting process. Its end portion Ps at the top end (the lower side of FIG. 2) of the cutting point 3 is positioned approximately at the center of the cutting edge 3a, and the length of the opening 5a towards the direction of the center axis O is about the same as the diameter Db of the body 2.

However, the position of the end portion Ps of the opening 5a at the top end of the cutting point 3 is not limited to a point approximately at the center of the cutting edge 3a, but preferably included within the range of the cutting edge 3a. In detail, if the end portion Ps of the opening 5a at the top end of the cutting point 3 is located at the top end of the cutting point 3, that is, if the intake hole 5 passes through the cutting point 3, the sufficient negative pressure is not obtained at the opening 5a, thereby causing the aspiration force during the aspiration process to become insufficient. As a result, the performance of the chip aspiration will be deteriorated.

On the other hand, if the end portion Ps of the opening 5a at the top end of the cutting point 3 is not located within the range of the cutting edge 3a, it means that the opening 5a is not positioned correspondingly to the range of the cutting edge 3a. This also deteriorates the performance of the chip aspiration.

Therefore, by setting the end portion Ps of the opening 5a at the top end of the cutting point 3 to fall within the range of the cutting edge 3a, decreases in the aspiration force can be avoided. Also, because each chip cut by the cutting edge 3a can be aspirated within the range of the cutting edge 3a, the performance of the chip aspiration is improved.

The open length of the opening 5a towards the direction of the center axis O is not limited to the diameter Db of the body 2, but can be any length between 50% and 150% of the diameter Db of the body 2. That is to say, if the length of the opening 5a towards the direction of the center axis O is less than 50% of the diameter Db of the body 2, an open area of the opening 5a is not sufficiently large enough to aspirate the chips. Consequently, the performance of the chip aspiration will be deteriorated.

In the meantime, if the length of the opening 5a towards the direction of the center axis O is more than 150% of the diameter Db of the body 2, an open area of the opening 5a is too large to obtain the sufficient negative pressure, thereby causing a decrease in the aspiration force during the aspiration process. This again deteriorates the performance of the chip aspiration.

Therefore, by setting the length of the opening towards the direction of the center axis O to be 50% or more and 150% or less of the diameter Db of the body 2, an optimum open area for the opening 5a can be secured and a the decrease in the aspiration force can be avoided. Naturally, the performance of the chip aspiration is improved.

Since the chips are not generated in areas outside the moving range of the cutting edge 3a, the maximum length of the opening 5a towards the direction of the center axis O can be 150% or less of the diameter Db of the body 2. In this way, the rigidity of the tool is secured without adversely affecting the performance of the chip aspiration. As a result, the tool life is prolonged.

Figure 3:
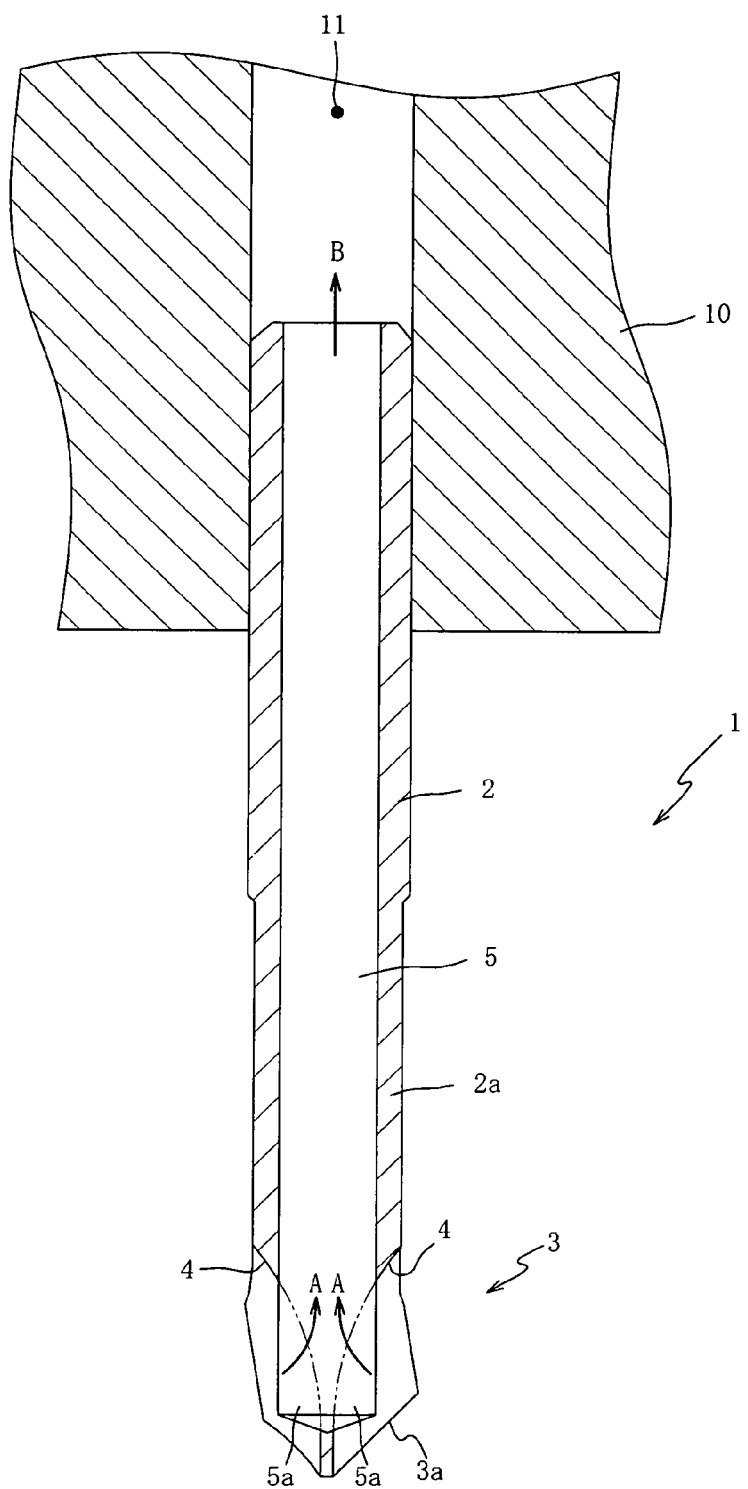
FIG. 3 is a cross-sectional view of a drill held in a holder.

With reference to FIG. 3, the following will now explain how to collect the chips by using the drill 1 with the configuration described so far. FIG. 3 is a cross-sectional view of the drill 1 held at the holder 10. In FIG. 3, part of the holder 10 is omitted. Also, FIG. 3 schematically shows the direction of movement of the chips by arrows A and B.

The drill 1, as shown in FIG. 3, is attached to the processing machine (not shown) as the body 2 is held at the holder 10. Moreover, during the cutting process, a pump (not shown) carries out the aspiration process on an internal space 11 that is formed inside the holder 10 from the processing machine side. Thus, the drill 1 performs aspiration through the intake hole 5.

In this case, the intake hole 5, as explained earlier, has the opening 5a that is opened from the outside of the body 2. Therefore, during the cutting process, the chips generated by the cutting edge 3a are forcibly aspirated from the opening 5a, as shown by the arrow A.

Moreover, as the aspiration by the pump continues, the chips having been aspirated from the opening 5a are discharged through the intake hole 5, as shown by the arrow B.

Next, two kinds of cutting tests using the drill 1 (hereinafter, they are referred to as a "first cutting test" and a "second cutting test", respectively) will be discussed by referring to FIG. 4. FIG. 4 provides the results of each test, where FIG. 4(a) shows the result of the first cutting test and FIG. 4(b) shows the result of the second cutting test.

The cutting tests are for examining the discharge capability of the chips generated in the cutting process in which the drill 1 forms a hole on a workpiece under predetermined cutting conditions. The cutting tests also judges whether or not the discharge capability is affected by the aspiration rate of the chips (the ratio of newly generated chips to already aspirated chips).

The detailed specifications of the cutting tests are as follows: Workpiece to be done: JIS-ADC12, Processing Machine used: Vertical Machining Center, Cutting Speed: 98 m/min, and Processing Depth: 30 mm.

More specifically, for the first cutting test, a variety of drills, each having the intake hole 5 of different diameter Dh in a predetermined range (from 2 mm to 4 mm), were employed as a comparison with the drill 1 explained in the exemplary embodiment of the present invention (hereinafter, referred to as the "present invention").

For the second cutting test, the present invention and a variety of drills, each having an opening 5a of different length towards the center axis O in a predetermined range (from 2.04 mm to 13.6 mm, namely, from 30% to 200% of the diameter Db of the body 2), were employed.

First, according to the result of the first cutting test provided in FIG. 4(a), the present invention demonstrated 100% chip aspiration rate, which means that all chips generated in the cutting process were aspirated. Therefore, one can conclude that its discharge capability of the chips is good.

Similarly, the drills having intake holes 5 of 2 mm and 3 mm in diameter Dh also demonstrated 100% chip aspiration rate, respectively, which means that they also aspirated all of the chips generated in the cutting process. Therefore, each drill shows a good discharge capability of the chips.

On the other hand, if the intake holes 5 are set to 3.5 mm and 4 mm in diameter Dh, the drills having such holes were broken and damaged. It is considered that the excessively large diameter Dh of the intake hole 5 compared with the diameter Db (=6.8 mm) of the body 2 made the wall thickness of the body 2 too small, thereby losing the rigidity of the tool.

As learned from these results, it is preferably to set the diameter Dh of the intake hole 5 to 65% or less of the diameter Db of the body 2. That is, if the diameter Dh of the intake hole 5 is larger than 65% of the diameter Db of the body 2, the wall thickness of the body 2 is reduced, thereby decreasing the rigidity of the tool. Therefore, by setting the diameter Dh of the intake hole 5 to 65% or less of the diameter Db of the body 2, the rigidity of the tool is secured and the tool life can be prolonged.

Moreover, according to the rest of the second cutting test provided in FIG. 4(b), the present invention demonstrated 100% chip aspiration rate, capable of aspirating all chips generated in the cutting process. In other words, the present invention had a good discharge capability of the chips.

Similarly, when the length of the opening 5a towards the direction of the center axis O is set to 3.4 mm and 8.16 mm, respectively, namely, 50% and 120% of the diameter Db of the body 2, the drills with such openings demonstrated 100% aspiration rate of the chips. This means that they also aspirated all chips generated in the cutting process. Therefore, each had drill shows a good discharge capability of the chips.

In contrast, when the length of the opening 5a towards the direction of the center axis O is set to 2.04 mm and 13.6 mm, that is, 30% and 200% of the diameter Db of the body 2, the drills with such openings were broken and damaged.

It is believed that if the open length of the opening 5a towards the center axis O is set to 2.04 mm (this corresponds to 30% of the diameter Db of the body 2), the ratio of the open area of the opening 5a to the chips generated in the cutting process is not sufficiently large enough to aspirate the chips from the opening 5a, only causing an increase in the cutting resistance.

In addition, if the length of the opening 5a towards the direction of the center axis O is set to 13.6 mm (this corresponds to 200% of the diameter Db of the body 2), the open area of the opening 5a is too large so that the rigidity of the tool has been lost.

As learned from these results, it is preferably to set the open length of the opening 5a towards the center axis O to a range from 50% to 150% of the diameter Dh of the body 2.

In short, because the drill 1 of this embodiment has the intake hole 5 as well as the opening 5a therein, the chip aspiration easily takes place through the intake hole 5 and the chips generated in the cutting process are forcibly aspirated from the opening 5a.

Because the chips can be discharged without the use of the cutting fluid, the drill of the present invention is useful for preventing environmental contamination. Also, the processing expense can be reduced by not using the cutting fluid.

Moreover, since the chips are forcibly aspirated from the opening 5a and discharged through the intake hole 5, the chips are not scattered around a workpiece and cleaning the chips can become simple and easy.

Furthermore, since the opening 5a is established on the chip discharge groove 4 and the chips are aspirated from the opening 5a, the groove 4 for accommodating the chips can be formed to have a smaller accommodating space, for example, the length of the groove can be shortened, the width of the groove 4 can be narrowed or the depth of the groove 4 can be reduced. In this manner, it is possible to ensure high rigidity of the tool and the tool life can be prolonged.

Also, the structure for discharging the chips is simplified by extending the intake hole 5a from a rear end side of the body 2.

In addition, as the groove 4 is extendedly formed from the top end of the cutting point 3 to the relieving surface 2a within the range of the cutting edge 3a, any chip generated by the cutting edge 3a can be accommodated within the full range of the cutting edge 3a. Thus, the chip holding capacity is increased and the performance of the chip aspiration can be improved.

Furthermore, since the extended length of the groove 4, from the cutting point 3 towards the body 2 which is expressed by a distance between the rear (left) end of the opening 5a and the rear (left) end of the groove 4 is shorter than the diameter Db of the body 2, the rigidity of the tool can be secured without decreasing the performance of the chip aspiration. This consequently increases the tool life.

While the present invention has been described with respect to the specific embodiments, it will be apparent to those skilled in the art that various changes and modifications may be made without departing from the spirit and scope of the invention as defined in the following Claims.

Although the exemplary embodiment adopted a spiral-shaped groove 4, the present invention is not limited thereto. For example, the groove 4 may have an approximately linear shape in parallel to the center axis O of the body 2.

Although the exemplary embodiment adopted two pieces of cutting edges 3a and the rake face of each has two grooves 4 formed thereon, the present invention is not limited thereto. For example, three pieces or more cutting edges 3a may be employed and the rake face of each may have three or more grooves 4 formed thereon.

Although the exemplary embodiment explained the integral formation of the cutting edge 3a at the cutting point 3, the present invention is not limited thereto. For example, the cutting edge 3a may be detachably formed at the cutting point 3 by throw-away tip to therefore manufacture a throw-away drill. In this case, the tool life can be prolonged simply by replacing the tip.

The invention claimed is:

1. A drill having a front end and a rear end, comprising:
a body at the rear end,
a cutting point at the front end with a cutting edge where the cutting point with the cutting edge is integrally extended from the body, and
a plurality of grooves concavely formed on outer surfaces of the cutting point and the body for composing a rake face of the cutting edge, thereby cutting a workpiece with the cutting edge when rotating about a center axis,
wherein an intake hole is formed inside the body and the cutting point, where the intake hole is extended from a rear end of the body to the cutting point,
wherein the intake hole has a circular cross-section and has a diameter smaller than a diameter of the body and larger than a bottom diameter of the groove and has an opening which is open from the groove towards the outside, where the bottom diameter is a diameter of a cylinder tangent to the plurality of grooves at a deepest point of each of the grooves,
wherein a front end of the opening is positioned within the cutting edge, and a cross sectional area of the opening perpendicular to the center axis is smaller than a cross sectional area of the intake hole perpendicular to the center axis, and
wherein an aspiration process is carried out through the intake hole with use of negative pressure, thereby aspirating chips generated during the cutting of the workpiece from the opening.

2. The drill according to claim 1,
wherein the diameter of the intake hole is 65% or less of the diameter of the body.

3. The drill according to claim 2,
wherein a length of the opening towards a direction of the center axis is in a range from 50% to 150% of the diameter of the body.

4. The drill according to claim 3,
wherein the groove is extendedly formed at least to the range of the cutting edge, and has an extended length such that a distance between a rear end of the opening and a rear end of the groove is shorter than the diameter of the body.

5. The drill according to claim 2,
wherein the groove is extendedly formed at least to the range of the cutting edge, and has an extended length such that a distance between a rear end of the opening and a rear end of the groove is shorter than the diameter of the body.

6. The drill according to claim 1,
wherein a length of the opening towards a direction of the center axis is in a range from 50% to 150% of the diameter of the body.

7. The drill according to claim 6,
wherein the groove is extendedly formed at least to the range of the cutting edge, and has an extended length such that a distance between a rear end of the opening and a rear end of the groove is shorter than the diameter of the body.

8. The drill according to claim 1,
wherein the groove is extendedly formed at least to the range of the cutting edge, and has an extended length such that a distance between a rear end of the opening and a rear end of the groove is shorter than the diameter of the body.

* * * * *